Jan. 1, 1935. P. J. JORGENSEN ET AL 1,985,929
THERMOSTATICALLY CONTROLLED FLUID MIXING DEVICE
Filed Jan. 19, 1932 2 Sheets-Sheet 1
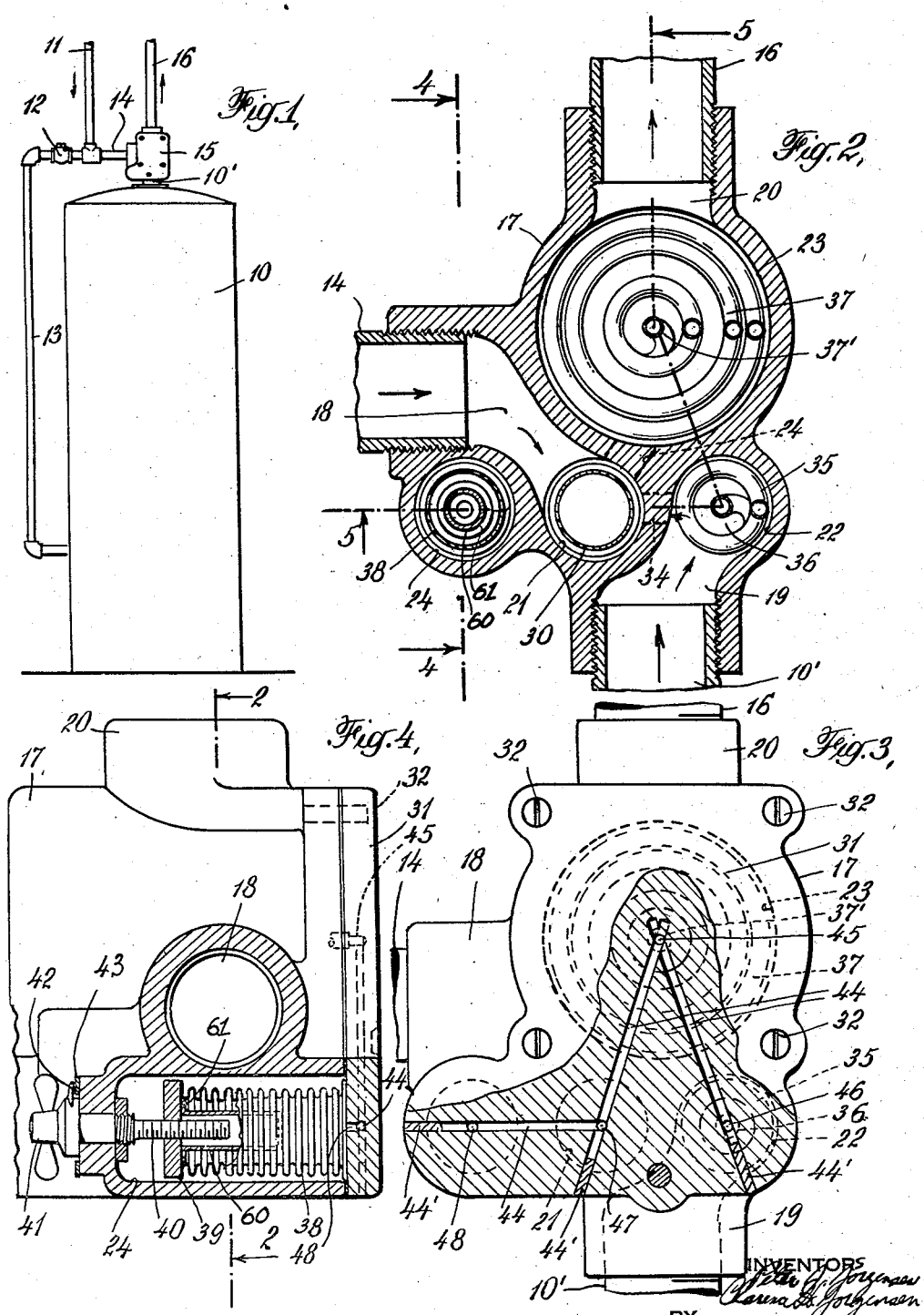
INVENTORS
Peter J. Jorgensen
Clarence Jorgensen
BY
Pennie, Davis, Marvin & Edmonds
ATTORNEYS Jan. 1, 1935.    P. J. JORGENSEN ET AL    1,985,929
THERMOSTATICALLY CONTROLLED FLUID MIXING DEVICE
Filed Jan. 19, 1932    2 Sheets-Sheet 2
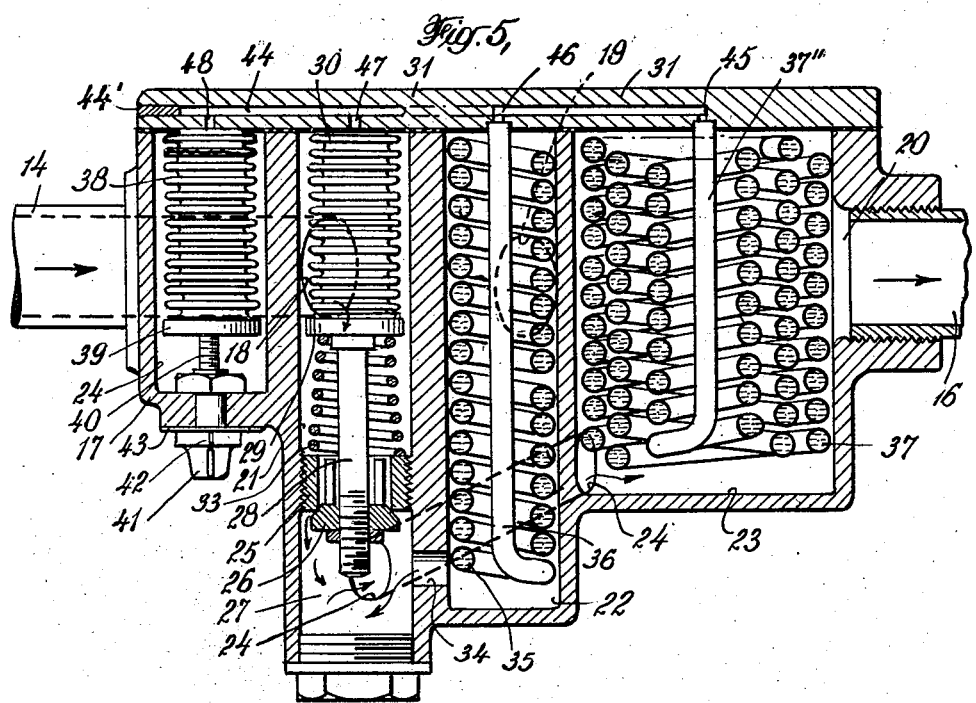
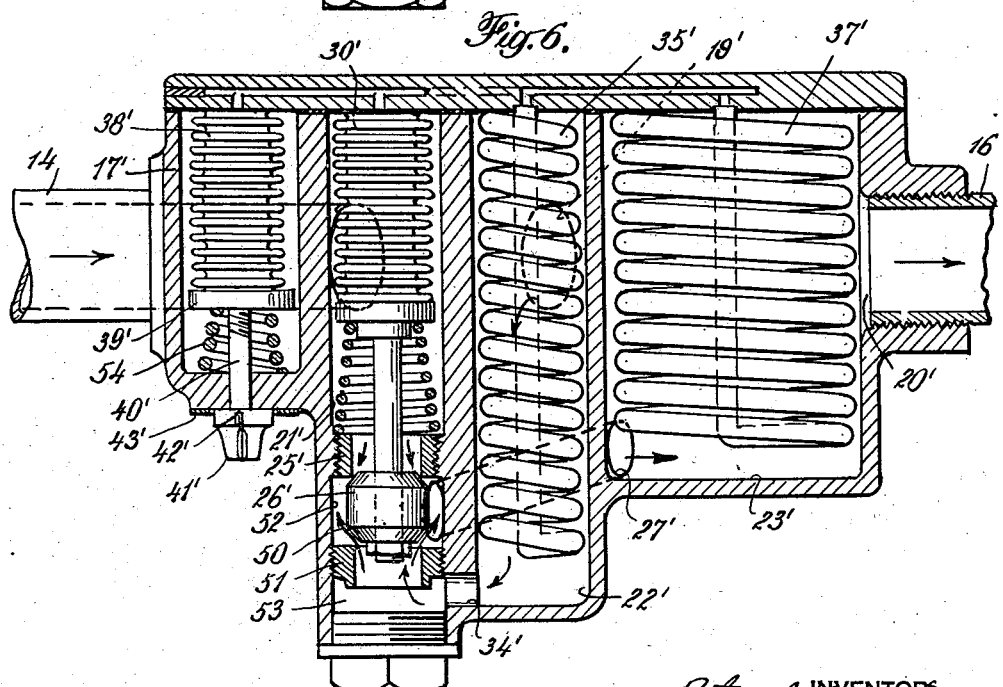
INVENTORS
*Peter J. Jorgensen*
*Clarence A. Jorgensen*
BY
*Pennie, Davis, Marvin & Edmonds*
ATTORNEYS Patented Jan. 1, 1935

1,985,929

UNITED STATES PATENT OFFICE 1,985,929

THERMOSTATICALLY CONTROLLED FLUID MIXING DEVICE

Peter J. Jorgensen, Chicago, and Clarence H. Jorgensen, Elmhurst, Ill., assignors to The Wilcolator Company, Newark, N. J., a corporation of Delaware Application January 19, 1932, Serial No. 587,518

19 Claims. (Cl. 236—12)

This invention relates to a thermostatically controlled fluid mixing device, and has particular reference to a devise adapted to be inserted at the junction of hot and cold water supply lines for automatically regulating the temperature of the mixture of the hot and cold water to a predetermined degree.

Numerous problems are encountered in attempting to provide a single device for automatically controlling the temperature of a water supply by regulating the quantity of hot and cold water in accordance with their relative temperatures before or when they are brought together to be mixed. For example, in any case some kind of a valve is necessary and as virtually all available water contains numerous mineral salts in solution and as these salts are precipitated out of solution when heated to a certain temperature, the valve moving mechanism in the device, if placed in the hot water supply in the usual way, is subject to being encrusted with mineral deposits to such a degree in a short time that the accuracy of the thermostatic regulating means is greatly impaired and the device becomes useless for the purpose for which it is intended. Furthermore, in order to respond to sudden variations in the temperature of the supply water the device must be made extremely sensitive and quick-acting and must be arranged to instantaneously change the proportions of hot and cold water in order to prevent the user from being severely burned by a sudden rush of hot water when a faucet or tap is opened. Also, in many installations the supply water pressure fluctuates to a considerable degree and this fluctuation is liable to affect the valve setting if the device is as sensitive as it should be, so that the valve action does not accurately represent the thermostatic effect of the water temperatures and the mixed water temperature consequently varies from the predetermined temperature.

The present invention has for its principal object the solution of the aforementioned problems and the provision of a compact, effective and extremely sensitive thermostatic mixing device for automatically regulating the temperature of water in accordance with the temperature of the hot, cold and mixed waters, so that it is supplied at a predetermined temperature, which may be regulated at will.

This object is obtained by providing a device which includes three thermostats severally responsive to the hot water, the cold water and the mixed water, a means for combining and co-relating the effects of each thermostat to produce a differential or net movement, and an arrangement for applying this movement to regulate the proportions of the hot and cold water quantities which are mixed together to form the mixture of predetermined temperature supplied by the device to the distributing system. The predetermined regulation of the temperature of the mixture is procured by a manual adjustment of the thermostatic system, so that the aforementioned movement produced jointly by the thermostats is varied to regulate the proportions of the hot and cold water for supplying the mixture at the proper temperature.

In its preferred form the device comprises a casing having hot water and cold water chambers and a mixed water chamber, each containing a thermostat. The hot water and mixed water thermostats are rigid containers whose interiors are connected to the interior of the expansible and contractible cold water thermostat. These thermostats contain a thermoresponsive liquid, whose net expansion and contraction in response to changes in temperature of the water to which the individual thermostats are subjected results in movement of the liquid into and out of the cold water thermostat, causing the latter to expand or contract in accordance with the joint effects of all three thermostats. A valve mechanism actuated by this movement of the cold water thermostat properly regulates the proportions of the hot and cold water quantities to procure mixed water at the predetermined temperature. The temperature adjusting means comprises an expansible and contractible chamber, whose interior is directly connected to the thermostatic system and is so arranged as to vary the volume thereof when contracted or expanded manually, whereby the extent of movement of the valve mechanism by the thermostatic liquid is varied to change the proportions of hot and cold water.

It will be seen that by providing thermostats responsive to both hot and cold waters in addition to the mixed water thermostat, a fully compensated valve action is obtained, i. e., any changes in temperature of the incoming hot and cold water are immediately compensated for by a corresponding adjustment of the valve mechanism in addition to the adjustment afforded by the mixed water thermostat. Each thermostat responds at once and positively to any change in temperature of the water to which it is subjected, and the effects of all three thermostats are combined and co-related to procure regulation of the valve mechanism to maintain the mixed water at the temperature preregistered on the scale of the device, whereby no injuries to a user by a sudden rush of hot water can result. This arrangement not only provides an unusual degree of sensitivity and accuracy, but also insures proper operation under any conditions of use, whether or not either or both the cold water temperature or the hot water temperature fluctuates widely. Furthermore, the valve motion is positive, being produced solely by the thermostatic action and so is unaffected by water pressure variations, which would ordinarily affect the setting of the valve mechanism and thus vary the proportions of hot and cold water.

It will also be observed that the valve mechanism, not being located in the hot water supply where the precipitation of the mineral salts from the hot water takes place, is not subject to objectionable encrustation or liming which would detract from the accuracy of operation of the device. In fact, the thermostatic motion is produced in the cold water chamber by the power bellows, so that any encrustation or liming in the hot water chamber will not produce sticky or frozen valve action nor will such deposits materially affect the operation of the hot water thermostat, as it does not move.

For a better understanding of the invention reference is made to the accompanying drawings in which Figure 1 illustrates the thermostatic mixing valve of this invention inserted in the junction of a cold water line and a hot water line leading from a hot water storage tank;

Figure 2 is a vertical section through the new device as seen along the line 2—2 of Fig. 4, showing the three passages through the wall of the casing;

Figure 3 illustrates an elevation of the device with a portion of the face plate broken away;

Figure 4 illustrates another elevation of the device with the regulating mechanism shown in section as seen along the line 4—4 of Fig. 2;

Figure 5 is a transverse section of the device as seen along the line 5—5 of Fig. 2 and illustrating what may be termed the single valve form of the invention, and Figure 6 is a similar cross-sectional view of a double valve form of the invention.

In these drawings a hot water heater and storage tank or instantaneous hot water heater 10 receives cold water from a supply line 11 through check valve 12 and pipe 13, and a branch 14 of this cold water line leads to the thermostatically controlled mixing device 15 of this invention. The device has a second intake which is connected to the hot water tank 10 by means of nipple or pipe 10′, and a discharge opening from which leads a mixed water pipe 16 to the several distributing pipes connected to taps, faucets, or the like. The temperature of the water passing through pipe 16 is regulated automatically in the device 15, so that the water is supplied at a constant predetermined temperature.

The device 15 includes a casing 17, preferably formed of cast metal and having three openings through the walls thereof. One of these openings 18 is arranged for the inlet of cold water and to it leads the cold water supply pipe 14. Another opening 19 serves as an intake for hot water and to it leads the nipple 10′ connected to the hot water heater or storage tank 10. The third opening 20 serves as an outlet for the mixed water and from it leads the outlet pipe 16.

As shown more clearly in Figs. 2 and 5, the casing 17 is provided with a plurality of chambers. Chamber 21 is connected to the cold water passage 18 and receives a constant supply of cold water from the pipe 14. Chamber 22 receives a constant supply of hot water from passage 19 through hot water nipple 10′. A third chamber 23 receives the mixture of hot and cold water from mixing chamber 27 through passage 24 and discharges it to passage 20 and pipe 16. A fourth chamber 24 not connected with any of the other chambers, contains an adjusting or regulating mechanism to be described later.

A bushing 25 is threaded into the cold water chamber 21 and serves as a seat for the valve 26, which separates cold water chamber 21 from mixing chamber 27. The valve 26 is carried by the valve stem 28 attached to the cap 29 on one end of the sealed flexible metal bellows 30, the other end of the bellows being seated against the cover plate 31 closing the casing 17 and held in place by means of screws 32 (Figs. 3 and 4). Between the bushing 25 and the cap 29 of the bellows 30 is a strong coil spring 33 which biases valve 26 to closed position and opposes any elongation of the bellows due to expansion.

The hot water chamber 22 is directly in communication with the mixing chamber 27 through a constricted orifice 34 which permits a relatively small but constant quantity of hot water to enter the mixing chamber 27. Within the chamber 22 is a bomb 35 preferably consisting of a helical coil of tubing, such as seamless copper tubing or the like, sealed at one end and provided with a straight section 36 at its other end which passes through the center of the coil and is secured to face plate 31. This bomb is so arranged that the hot water entering the hot water chamber 22 through opening 19 contacts with the bomb through substantially its entire length before it enters the mixing chamber 27 through orifice 34. This bomb has a relatively large surface in contact with the hot water because of its large number of convolutions. The cold water passing through the cold water chamber 21 contacts with the bellows 30, which has a relatively large surface area because of the surface convolutions.

The mixed water chamber 23, which receives the mixture of hot and cold water from the mixing chamber 27 through passage 24, also contains a bomb 37 in the form of a helical tube in three concentric sections and presenting a large surface area to the mixed water in chamber 23 before this mixture passes out through passage 20. One end 37 of the bomb is sealed while the other end is provided with a straight portion 37″, which is secured in an opening in the face plate 31.

The fourth chamber 24, contains a flexible metal bellows 38 similar to the cold water or power bellows 30. One end of this bellows 38 is secured and sealed to the face plate 31, while the other end is sealed by a cap 39, into which is threaded a stem 40, which passes through an opening in the wall of casing 17 and is provided with a handle or knob 41 having a pointer 42 which moves over a scale 43 as the knob 41 is manipulated. This scale 43 is marked in degrees of temperature and the temperature of the mixture issuing from passage 20 may be determined by setting the pointer at the desired temperature on scale 43 by means of knob 41. The threaded connection between cap 39 and adjusting stem 40 is sealed against leakage by a thin metal cup 60 having a depth slightly greater than the maximum projection of stem 40 in the bellows 38 and soldered or otherwise secured by its flanged lip 61 to the inner surface of cap 39, as illustrated in Fig. 4.

The face plate 31 contains a number of small passages, by means of which the various elements in casing 17 are interconnected. The scheme of these passages is best illustrated in Figs. 3 and 5. The longitudinal passage 44 (Fig. 5) is formed by three drilling operations through the edge of face plate 31 and the open ends of these drilled passages are plugged by means of solder 44' or the like. The passage 44 communicates with the interior of bomb 37 by drilling the passage 45 transversely through the face plate so that it leads into the bomb extension 37''. The outer end of this passage 45 is sealed by being plugged up with solder or the like. The interior of bomb 35 is placed in communication with passage 44 by means of passage 46 in the same way, while the interior of bellows 30 is connected with passage 44 by means of passage 47 and the interior of bellows 38 is connected to passage 44 by means of passage 48. It will be seen, therefore, that each of the bombs 35 and 37 is placed into communication with each of the bellows 30 and 38 and that the bombs and bellows are in communication with each other, so that any change taking place in any one of these devices is instantly transmitted or transferred to the other devices whereby they mutually affect each other.

Bombs 35 and 37 and bellows 30 and 38 are each filled with a liquid which is sensitive to temperature changes and responds by expanding materially when heated and contracting as materially when cooled. Representative liquids having active thermostatic properties are alcohol, turpentine and the like. Each of the three thermostats, i. e. the hot water bomb 35, the cold water bellows 30 and the mixed water bomb 37 responds individually to the temperature of the water to which it is subjected, and as the bombs 35 and 37 are not expansible or contractible the net thermostatic effect of all three thermostats is communicated to the power bellows or cold water thermostat 30 which lengthens or shortens a corresponding amount to provide power, the use of which will be explained later.

The regulating or adjusting bellows 38 is filled with the same thermostatic liquid, but is not directly subjected to either the hot, cold, or mixed water. Its primary function is to supply more or less of the motive liquid to the system through passage 44 when it is compressed or allowed to expand by manipulation of its knob 41 in accordance with a predetermined temperature desired for the mixed water. This regulation or adjustment affects power or cold water bellows 30 principally because the bombs 35 and 37 are rigid and the liquid therein is relatively incompressible mechanically, so that the increased or decreased pressure on bellows 38 is transmitted directly to the cold water bellows 30 which lengthens or shortens accordingly.

In utilizing the form of thermostatically controlled mixing device illustrated by Figs. 1 to 5, inclusive, for regulating the temperature of a mixture of hot and cold water to a predetermined degree, for example, the device 15 is preferably mounted in the hot and cold water circulating system in the manner illustrated in Fig. 1. The cold water stream supplied by the pipe 11 is divided, one portion flowing through pipe 13 into instantaneous heater or heater and storage tank 10, and the other portion flowing into device 15 through pipe 14. The check valve 12 is provided in the cold water branch 13 leading to the tank 10 to prevent theremosiphonic circulation of hot water from tank 10 through device 15, pipes 14 and 13, back to tank 10. Accordingly, water only circulates through pipes 13 and 14 when mixed water is drawn through pipe 16, whereupon cold water flows through pipe 14 to device 15 and the check valve 12 is opened by the flow of cold water through pipe 13 into tank 10 to replace the water drawn therefrom. In an alternative arrangement, the check valve 12 may be placed either in the pipe 14 or in the cold water inlet 18 of the casing 17 of device 15, in order to prevent the objectionable thermo-siphonic circulation of the water through the device 15, and this check valve will open to supply cold water to the device only when mixed water is drawn therefrom.

The hot water enters the mixing device 15 from the tank 10 through pipe or nipple 10' and passage 19, and is discharged into hot water chamber 22, from which it flows through a constricted orifice 34 into the mixing chamber 27. It will be noted that the hot water supply to the mixing chamber 27 is continuous. The cold water enters the mixing device 15 through pipe 14 and passage 18 into cold water chamber 21 from which it flows past the valve 26 into mixing chamber 27 to mix with the hot water supplied through orifice 34. This mixed water flows from mixing chamber 27 through passage 24 into mixed water chamber 23, where it circulates around bomb 37 before it flows out through passage 20 and pipe 16.

The hot water bomb 35 responds to the changes in temperature of the hot water. Assuming that the temperature of the hot water is increased, the thermostatic fluid in bomb 35 expands and a flow is created through passage 44 into power bellows 30, which accordingly elongates and opens valve 26 wider, whereby an increased supply of cold water is mixed with the hot water in mixing chamber 27 to reduce the temperature of the mixture to the predetermined temperature preregistered by pointer 42 on scale 43. The regulation of the temperature of the mixture by the thermostatic action of the hot water bomb 35 in the manner described, tempers the hot water to approximately the proper temperature, but the mixed water bomb 37, being extremely sensitive, provides for a finer adjustment by adding to or subtracting from the effective expansion or contraction of the thermostatic fluid in bomb 35 so that the net effect of both bombs controls the degree at which cold water valve 26 is opened or closed.

The foregoing description of operation is based on the assumption that the temperature of the cold water supply does not change so that the motion of the bellows 30 is not affected by any change in its own thermostatic action. If, however, the temperature of the cold water circulating around bellows 30 changes, the liquid therein will expand or contract proportionately to add to or subtract from the thermostatic effect of the hot water bomb 35 and the mixed water bomb 37, so that the valve 26 is readjusted accordingly to open wide if the cold water temperature rises and to close further if the cold water temperature falls.

When it is desired to readjust the device so that the mixed water is supplied at a higher temperature, for example, the user manipulates knob 41 so that pointer 42 designates the desired higher temperature on scale 43. This results in elongation of the adjusting bellows 38 so that the total volume of the system is increased without any increase in the thermostatic liquid volume. This means that part of the liquid from the power bellows 30 is transferred to adjusting bellows 38 through passage 44, the spring 33 causing this change by compressing power bellows 30. Accordingly, valve 26 closes sooner, so that the relative supply of cold water to the mixing chamber 27 is decreased with the result that the temperature of the mix is higher as desired. On the other hand, when it is desired to decrease the temperature of the mix the reverse action takes place, so that the compression of adjusting bellows 38 decreases the volume of the thermostatic system and additional liquid is supplied to power bellows 30, so that valve 26 closes later and supplies a greater amount of cold water to the mix whereby its temperature is lowered as desired.

In the modified arrangement illustrated in Fig. 6 the mixed water bomb 37', the hot water bomb 35', the cold water thermostat or power bellows 30' and the adjusting bellows 38' are provided as before. However, power bellows 30' not only carries the cold water valve 26' but the valve is a double valve and its opposite end 50 acts as a hot water valve which cooperates with the valve seat 51 threaded into the chamber 21'. The mixing chamber 52 lies between the two valve seats 25' and 51 and is connected by passage 27' with the mixed water chamber 23'. An unconstricted orifice 34' supplies water from hot water chamber 22' to hot water valve chamber 53.

As before, pipe 14 supplies cold water to cold water chamber 21', pipe 10' supplies hot water to hot water chamber 22' and the mixed water is discharged from mixed water chamber 23' through pipe 16.

Instead of being locked against endwise movement, the stem 40' of adjusting bellows 38' is slidable lengthwise through the corresponding opening in the wall of casing 17'. As before, the adjusting knob 41' may be manipulated by the user so that its pointer 42' designates a predetermined temperature on scale 43' at which the mixed water is desired. Between cap 39' of adjusting bellows 38' and the inner wall of casing 17' is a coil spring 54, the purpose of which will be described later.

In use, the modified device of this invention illustrated by Fig. 6 is placed at the junction of the respective hot and cold water supply lines 10' and 14, and the mixed water pipe 16 is connected to the discharge opening 20' of the casing 17'. Hot water in chamber 22' circulates around hot water bomb 35' and cold water in chamber 21' circulates around cold water bellows 30', and the net expansion or contraction of the thermostatic liquid results in actuation of power bellows 30' to position the double valve 26'—50 so that the supply of cold water passing valve 26' and the supply of hot water passing valve 50 are controlled automatically. Accordingly when the waters are brought together in mixing chamber 52, the temperature of the mixture approximates the temperature preregistered on scale 43' by pointer 42', but the final regulation of valves 26' and 50 is effected by the mixed water bomb 37', which has a large area and consequently a large degree of cubical expansion and contraction and so is sensitive to the temperature of the mixed water which flows around it. The thermostatic effect of the liquid in bomb 37' is accordingly added to or subtracted from the joint thermostatic effects of the liquids in hot water bomb 35' and cold water bellows 30' so that the latter is expanded or contracted according to the net thermostatic effect of the system, and the valves 26' and 50 are accurately adjusted.

Assume that the temperature of the hot water increases and the temperature of the cold water remains unchanged. This means that the temperature of the mixed water will be higher than the temperature preregistered on scale 43' unless the mixture is regulated. This regulation is accomplished automatically inasmuch as the increased temperature of the water around hot water bomb 35' causes the fluid therein to expand and create a flow toward power bellows 30', which accordingly expands and opens valve 26' to increase the supply of cold water to the mixing chamber 52. Simultaneously, the hot water valve 50 is moved toward closed position, whereby the supply of hot water to the mixing chamber 52 is decreased. Accordingly, the temperature of the mixed water designated on scale 43' remains unchanged.

In case the temperature of the hot water remains the same but temperature of the cold water increases or decreases, the bellows 30' responds to compensate for this change by changing the position of valve 26' and moving hot water valve 50 in the opposite direction, whereby the cold water supply is increased or decreased, to compensate for its change in temperature while the hot water supply is correspondingly regulated.

In the event that the hot water suddenly increases to an abnormally high temperature, which exceeds the limit at which the valve 50 is set and there is insufficient cold water to temper the hot water, the hot water bomb 35' responds, with the result that the power bellows 30' is expanded to close the hot water valve 50 altogether, which prevents the sudden rush of hot water when a remote valve or tap is turned on by a user. If the temperature of the hot water remains beyond the limit at which hot water valve 50 is set, and there is still insufficient cold water to compensate for this increase in temperature, the continued expansion of the thermostatic fluid in bombs 35' and 37' would tend to cause a further extension of power bellows 30', with the result that hot water valve 50 would be forced against its seat 51 with consequent injury to valve 50 and its seat 51. However, a relief for this condition is provided by adjusting bellows 38' which takes up any increased flow of the thermostatic fluid after valve 50 is closed. The consequent expansion and elongation of adjusting bellows 38', causes its stem 40' to push through its aperture in the casing 17' to relieve the excess pressure. Equilibrium is restored by spring 54 the instant the volume of the thermostatic fluid contracts in response to decreased temperature of the hot water supply or restoration of the cold water supply.

It will be seen that the thermostatically controlled mixing device of this invention is extremely effective and sensitive and responds to all changes and conditions which are encountered in actual use. It automatically compensates for sudden increases in temperature of the hot water supply by properly proportioning the cold water and the hot water supplies. Also by confining any encrustation caused by precipitation of mineral salts from hot water to a point where it will do no damage, the device may be used for indefinite periods without requiring cleaning or repairs aside from occasional inspection and adjustment of the mixed water temperature. The only moving part is a single valve or a double valve, which is so simply arranged as to cause no difficulty and does not get out of order readily. Another meritorious feature of the invention is that it permits of balancing the valve.

We claim:

1. In a thermostatically controlled fluid mixing device, the combination of a casing having hot and cold fluid inlets and a mixture outlet, means between at least one of the inlets and the outlet responsive to the temperature of the fluid entering the inlet, a valve between at least one of the inlets and the outlet for controlling the supply of the fluid to the outlet, motive connections between said means and said valve, whereby the supply of the fluid passing the valve is regulated in accordance with the temperature of one of the inlet fluids, and mechanism independent of the valve for directly adjusting said means to vary the action of said valve.

2. In a thermostatically controlled fluid mixing device, the combination of a casing having a hot liquid inlet, a cold liquid inlet and a mixed liquid outlet, means in the casing responsive to the temperatures of the outlet and one of the inlet liquids, a valve in the casing for controlling the supply of said one inlet liquid, and motive connections between said means and said valve whereby the supply of the liquid passing said valve is regulated in accordance with the temperatures of two of the liquids.

3. In a thermostatically controlled fluid mixing device, the combination of a casing having a hot liquid inlet, a cold liquid inlet, and a mixture outlet, means in the casing responsive to the temperature of the mixture, separate means in the casing responsive to the temperature of at least one of the liquids, a valve in the casing for controlling the supply of said one inlet liquid, and motive connections between said valve and both of said means, whereby the supply of the liquid passing said valve is regulated in accordance with the temperature of the mixture and one of the liquids.

4. In a thermostatically controlled fluid mixing device, the combination of a casing having a hot fluid inlet, a cold fluid inlet, and a mixture outlet, means in the casing responsive to the temperature of the mixture, separate means in the casing responsive to the temperature of the hot and cold fluids, a valve in the casing for controlling the supply of at least one of said fluids, and motive connections between said valve and both of said means, whereby the supply of the fluid passing said valve is regulated in accordance with the temperatures of the mixture and the hot and cold fluids.

5. In a thermostatically controlled fluid mixing device, the combination of a casing having a mixing chamber and separate hot and cold liquid inlets communicating therewith, a valve between only one of said inlets and the mixing chamber, and means in the casing responsive to the temperature of said one inlet liquid and the mixture for controlling the valve, whereby the supply of the liquid passing the valve is regulated in accordance with the temperatures of the mixture and one of the liquids.

6. In a thermostatically controlled fluid mixing device, the combination of a casing having a mixing chamber and hot and cold fluid inlets communicating therewith, a valve between one of said inlets and the mixing chamber, a thermostat between each of the fluid inlets and the mixing chamber, and motive connections between both of said thermostats and said valve, whereby the supply of the fluid passing the valve is regulated in accordance with the temperature of both of the inlet fluids.

7. In a thermostatically controlled fluid mixing device, the combination of a casing having a mixing chamber and hot and cold fluid inlets communicating therewith, a valve between one of said inlets and the mixing chamber, a thermostat in the casing responsive to the mixture, a thermostat between each of the fluid inlets and the mixing chamber, and motive connections between said thermostats and said valve, whereby the supply of the fluid passing the valve is regulated in accordance with the temperature of the inlet fluids and the mixture.

8. In a thermostatically controlled fluid mixing device, the combination of a casing having a mixing chamber and hot and cold fluid inlets communicating therewith, a thermostat between each of the inlets and the mixing chamber, a separate thermostat responsive to the temperature of the mixture, a valve between the cold water inlet and the mixing chamber and motive connections between said thermostats and said valve, whereby the supply of cold water is regulated in accordance with the temperatures of the hot, cold and mixed fluid temperatures.

9. In a thermostatically controlled fluid mixing device, the combination of a casing having a mixing chamber and separate hot and cold fluid inlets communicating therewith, a valve between the cold fluid inlet and the mixing chamber, a thermostat in the casing responsive to the mixture, a second thermostat between the cold fluid inlet and the mixing chamber, and motive connections between said thermostats and said valve, whereby the supply of cold fluid to the mixing chamber is regulated in accordance with the temperatures of the cold fluid and the mixture.

10. In a thermostatically controlled fluid mixing device, the combination of a casing having a mixing chamber and separate hot and cold fluid inlets communicating therewith, a valve means between the cold and hot fluid inlets and the mixing chamber, a thermostat between each fluid inlet and the mixing chamber, and motive connections between both of said thermostats and said valve means, whereby the supply of hot and cold fluid to the mixing chamber is regulated in accordance with the temperature of both of the incoming fluids.

11. In a thermostatically controlled fluid mixing device, the combination of a casing having a mixing chamber and separate hot and cold fluid inlets communicating therewith, a single valve means between the cold and hot fluid inlets and the mixing chamber, a thermostat between at least one fluid inlet and the mixing chamber, and motive connections between said thermostat and said valve means, whereby the supply of hot and cold fluids to the mixing chamber is regulated in accordance with the temperature of at least one of the incoming fluids.

12. In a thermostatically controlled fluid mixing device, the combination of a casing having a mixing chamber and separate hot and cold fluid inlets communicating therewith, a valve means between the cold and hot fluid inlets and the mixing chamber, a thermostat between at least one of the inlets and the mixing chamber, a second thermostat in the casing responsive to the temperature of the mixture, and motive connections between said thermostats and said valve means, whereby the supply of the cold and hot fluids to the mixing chamber is regulated in accordance with the temperatures of the mixture and at least one of the fluids.

13. In a thermostatically controlled fluid mixing device, the combination of a casing having a mixing chamber and separate hot and cold fluid inlets communicating therewith, a valve means between the cold and hot fluid inlets and the mixing chamber, a thermostat between each fluid inlet and the mixing valve, a second thermostat in the casing responsive to the temperature of the mixture, and motive connections between said thermostats and said valve means, whereby the supply of the cold and hot fluids to the mixing chamber is regulated in accordance with the temperatures of the mixture and the hot fluid.

14. In a thermostatically controlled mixing device, the combination of a casing having a mixing chamber and separated hot and cold fluid inlets communicating therewith, a valve between each inlet and said mixing chamber, a thermostat between each inlet and said mixing chamber, a separate thermostat responsive to the temperature of the mixture, and motive connections between each of said valves and said thermostats, whereby the net thermostatic effect of said thermostats regulates the supply of both hot and cold fluids to said mixing chamber.

15. In a thermostatically controlled fluid mixing valve, the combination of a casing having a mixed fluid chamber and hot and cold fluid inlet chambers connected thereto, a bomb in the mixed fluid chamber and one of the inlet fluid chambers, an expansible and contractible container communicating with both bombs, a column of thermostatic liquid between the bombs and container, and a valve actuated by said container for controlling the supply of said one inlet fluid to the mixed liquid chamber, whereby change in volume of the liquid in the bombs in response to change of temperature of the fluids in contact therewith actuates the valve to regulate the temperature of the mixed liquid to a predetermined degree.

16. In a thermostatically controlled fluid mixing valve, the combination of a casing having a mixed fluid chamber and hot and cold fluid chambers connected thereto, a bomb in at least one of said chambers, an expansible and contractible container connected thereto, a column of thermostatic liquid connecting the bomb and container, a valve actuated by said container for controlling the supply of at least one of said fluids to the mixed fluid chamber, and a second expansible and contractible container connected to the bomb and first container and containing the thermostatic liquid, said second container regulating the volume of the thermostatic system and serving as a relief for abnormal pressure therein.

17. In a mixing device, the combination of thermostatic devices in the supply lines for the hot water and the cold water, a third thermostatic device in the mixture of hot and cold water, and means for co-relating and applying the action of the said three thermostats to regulate the relative quantities of the hot and cold water mixed together.

18. In a mixing device, the combination of thermostatic devices in the supply lines for the hot water and the cold water, a third thermostatic device in the mixture of hot and cold water, means for co-relating and applying the action of the said three thermostats to regulate the relative quantities of the hot and cold water mixed together and a manually operable device for effecting a variation in the said regulation.

19. In a mixing device, the combination of a casing having hot water and cold water inlets and a mixed water outlet, thermostatic means in the casing for regulating the relative proportions of cold and hot water mixed together, and a check valve communicating with one of said inlets and operable in response to the flow of mixed water from the mixed water outlet for permitting the flow of water into at least one of the inlets of the casing.

PETER J. JORGENSEN.
CLARENCE H. JORGENSEN.

CERTIFICATE OF CORRECTION.

Patent No. 1,985,929. January 1, 1935.

PETER J. JORGENSEN, ET AL.

It is hereby certified that error appears in the printed specification of the above numbered patent requiring correction as follows: Page 1, first column, line 3, for "devise" read device; page 3, second column, line 66, for "wide" read wider; and page 6, second column, line 38, claim 19, for "operable" read openable; and that the said Letters Patent should be read with these corrections therein that the same may conform to the record of the case in the Patent Office.

Signed and sealed this 5th day of March, A. D. 1935.

Leslie Frazer (Seal)  Acting Commissioner of Patents.